US012182894B2

(12) United States Patent
Shao et al.

(10) Patent No.: US 12,182,894 B2
(45) Date of Patent: Dec. 31, 2024

(54) METHODS FOR DETERMINING AN ALLOCATION SCHEME OF ACCIDENT RESCUE RESOURCE IN A SMART CITY AND INTERNET OF THINGS SYSTEMS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Yuefei Wu, Chengdu (CN); Xiaojun Wei, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 251 days.

(21) Appl. No.: 17/813,017

(22) Filed: Jul. 15, 2022

(65) Prior Publication Data

US 2023/0419435 A1 Dec. 28, 2023

(30) Foreign Application Priority Data

Jun. 28, 2022 (CN) ......................... 202210741980.5

(51) Int. Cl.
*G06Q 50/26* (2024.01)
*G08B 21/02* (2006.01)

(52) U.S. Cl.
CPC ........... *G06Q 50/265* (2013.01); *G08B 21/02* (2013.01)

(58) Field of Classification Search
CPC ........... G06Q 50/265; G06Q 10/06313; G06Q 10/06315; G06Q 50/26; G08B 21/02; G16Y 20/30
See application file for complete search history.

(56) References Cited

U.S. PATENT DOCUMENTS 10,997,430 B1 * 5/2021 Slavin .................... G06V 20/56
2014/0155018 A1 * 6/2014 Fan ...................... H04W 72/51
455/404.1

(Continued)

FOREIGN PATENT DOCUMENTS

CN 102169558 A 8/2011
CN 106910018 A 6/2017

(Continued)

OTHER PUBLICATIONS

Shao, Zehua, Exploration and Research on the Structure of Internet of Things, Internet of Things Technologies Reliable Transmission, 2015, 10 pages.

(Continued)

*Primary Examiner* — Florian M Zeender
*Assistant Examiner* — Karma A El-Chanti
(74) *Attorney, Agent, or Firm* — METIS IP LLC

(57) ABSTRACT

The present disclosure provides a method for determining an allocation scheme of accident rescue resource in a smart city. The method comprises: obtaining accident information of an accident point based on the object platform; sending the accident information to the management platform based on the sensor network platform; determining resource demand of the accident point based on the accident information through the management platform; obtaining available resource of at least one candidate rescue point based on the object platform; sending the available resource to the management platform based on the sensor network platform; determining the allocation scheme of rescue resource based on the resource demand and the available resource through the management platform; and sending the allocation scheme of rescue resource to the user platform through the service platform.

17 Claims, 6 Drawing Sheets

500

(56) References Cited

U.S. PATENT DOCUMENTS

| | | | | |
|---|---|---|---|---|
| 2014/0172496 | A1* | 6/2014 | Rosjat | G06Q 10/0635 705/7.28 |
| 2014/0317041 | A1* | 10/2014 | Kim | H04L 12/4625 706/50 |
| 2017/0098181 | A1* | 4/2017 | Herman | G06N 20/00 |
| 2018/0176757 | A1* | 6/2018 | Kaindl | G08G 1/205 |
| 2019/0306205 | A1* | 10/2019 | Florey | H04L 65/65 |
| 2019/0313230 | A1* | 10/2019 | MacGabann | H04L 67/56 |
| 2019/0339709 | A1* | 11/2019 | Tay | G06F 16/23 |
| 2019/0378397 | A1* | 12/2019 | Williams, II | G06N 5/043 |
| 2020/0346751 | A1* | 11/2020 | Horelik | G05D 1/101 |
| 2021/0319203 | A1* | 10/2021 | Boufis | G06V 20/17 |
| 2021/0403062 | A1* | 12/2021 | Bramucci | B61L 23/041 |
| 2022/0009437 | A1* | 1/2022 | Algarni | H04W 4/90 |
| 2022/0346728 | A1* | 11/2022 | Haley | H04W 4/38 |
| 2023/0069173 | A1* | 3/2023 | Faizan | G08G 1/087 |
| 2023/0309164 | A1* | 9/2023 | Xu | H04W 28/24 |

FOREIGN PATENT DOCUMENTS

| | | |
|---|---|---|
| CN | 107909256 A | 4/2018 |
| CN | 114443303 A | 5/2022 |

OTHER PUBLICATIONS

Shao, Zehua, The Internet of Things sense the world beyond the world, China Renmin University Press. 2017, 30 pages.
Shao, Zehua, Smart City Architecture, Internet of Things Technologies Intelligent Processing and Application, 2016, 7 pages.
White Paper on Urban Brain Development, Smart City Standard Working Group of National Beacon Commission, 2022, 59 pages.
Zhang, Yi et al., Emergency Resource Scheduling System of Expressway, Information Technology, 2020, 6 pages.

* cited by examiner

500

METHODS FOR DETERMINING AN ALLOCATION SCHEME OF ACCIDENT RESCUE RESOURCE IN A SMART CITY AND INTERNET OF THINGS SYSTEMS

CROSS-REFERENCE TO RELATED APPLICATIONS

This application claims priority to Chinese Patent Application No. 202210741980.5, filed on Jun. 28, 2022, the entire contents of which are hereby incorporated by reference.

TECHNICAL FIELD

This present disclosure relates to the field of accident rescue, in particular to a method for determining an allocation scheme of accident rescue resource in a smart city and an Internet of Things system.

BACKGROUND

Natural disasters such as earthquakes, fires, and car accidents or man-made accidents are sudden. When transporting food, medical supplies, and other materials to the disaster/accident point, the materials stored in different material storage points are different, and the distance from the disaster/accident point to different material storage points is different. A reasonable material allocation scheme is required to meet the sudden demand.

Therefore, it is necessary to provide a method that can quickly determine an allocation scheme of accident rescue resource, so as to meet the real-time requirements of emergency situations.

SUMMARY

This present disclosure provides a method for determining an allocation scheme of accident rescue resource in a smart city. The method is implemented based on an Internet of Things system determined by the allocation scheme of accident rescue resource in the smart city. The Internet of Things system comprises a user platform, a service platform, a management platform, a sensor network platform, and an object platform. The method comprises: obtaining accident information of an accident point based on the object platform; sending the accident information to the management platform based on the sensor network platform; determining resource demand of the accident point based on the accident information through the management platform; obtaining available resource of at least one candidate rescue point based on the object platform; sending the available resource to the management platform based on the sensor network platform; determining the allocation scheme of rescue resource based on the resource demand and the available resource through the management platform; and sending the allocation scheme of rescue resource to the user platform through the service platform.

This present disclosure provides an Internet of Things system for determining an allocation scheme of accident rescue resource in a smart city. The Internet of Things system comprises a user platform, a service platform, a management platform, a sensor network platform, and an object platform. The object platform is used to obtain accident information of an accident point, the accident information including at least one of accident type and accident severity. The sensor network platform is used to send the accident information to the management platform. The management platform is used to determine resource demand of the accident point based on the accident information. The object platform is used to obtain available resource of at least one candidate rescue point. The sensor network platform is further used to send the available resource to the management platform. The management platform is further used to determine the allocation scheme of rescue resource based on the resource demand and the available resource; and the service platform is used to send the allocation scheme of rescue resource to the user platform.

This present disclosure provides a non-transitory computer-readable storage medium, the storage medium stores computer instructions, and the computer instructions are executed by a processor to implement the method for determining an allocation scheme of accident rescue resource in a smart city.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same number denote the same structure, wherein.

DETAILED DESCRIPTION

Figure 1:
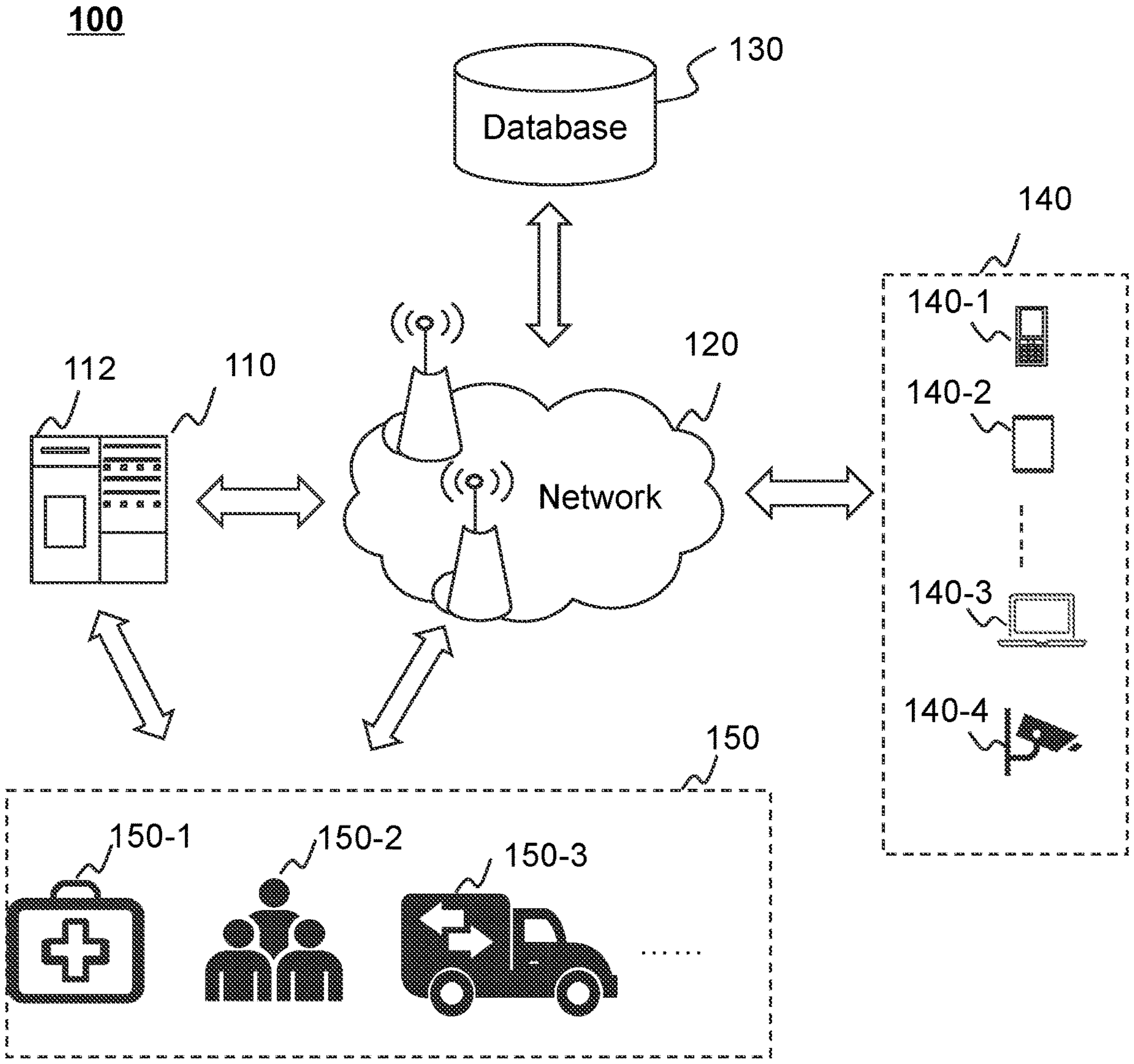
FIG. 1 is a schematic diagram of an application scenario illustrating an Internet of Things system for determining an allocation scheme of accident rescue resource in a smart city according to some embodiments of this present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms “system,” “device,” “unit,” and/or “module” used herein are one method to distinguish different components, elements, parts, sections, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram of an application scenario illustrating an Internet of Things system for determining an allocation scheme of accident rescue resource in a smart city according to some embodiments of this present disclosure.

The application scenario 100 may include a server 110, a network 120, a database 130, a terminal device 140, and a resource 150. The server 110 may include a processing device 112.

In some embodiments, the application scenario 100 of the Internet of Things system for determining an allocation scheme of accident rescue resource in a smart city may obtain query results for user query requirements by implementing the methods and/or processes disclosed in this present disclosure. For example, the processing device may obtain accident information of an accident point based on the object platform; send the accident information to the management platform based on the sensor network platform; determine resource demand of the accident point based on the accident information through the management platform; obtain available resource of at least one candidate rescue point based on the object platform; send the available resource to the management platform based on the sensor network platform; determine the allocation scheme of rescue resource based on the resource demand and the available resource through the management platform; and send the allocation scheme of rescue resource to the user platform through the service platform.

The server 110 and the terminal device 140 may be connected through the network 120, and the server 110 may be connected with the database 130 through the network 120. The server 110 may be used to manage resource and process data and/or information from at least one component of the system or external data sources (e.g., a cloud data center). In some embodiments, accident information of an accident point may be obtained through the server 110. The server 110 may obtain the data on the database 130 or save the data to the database 130 during processing. In some embodiments, the server 110 may be a single server or server group. In some embodiments, the server 110 may be regional or remote. In some embodiments, the server 110 may be implemented on a cloud platform or provided in a virtual manner.

In some embodiments, the server 110 may include a processing device 112. The processing device 112 may process data and/or information obtained from other devices or system elements. The processor may execute program instructions based on such data, information and/or processing results to perform one or more of the functions described in this present disclosure. In some embodiments, the processing device 112 may include one or more sub-processing devices (e.g., a single-core processing device or a multi-core multi-core processing device). Merely by way of example, the processing device 112 may include a central processing unit (CPU), an application specific integrated circuit (ASIC), or the like, or any combination thereof.

The network 120 may connect various components of the application scenario 100 and/or connect the system and external resource parts. The network 120 enables communication between the various parts and other parts outside the system, facilitating the exchange of data and/or information. In some embodiments, the network 120 may be any one or more of wired network or wireless network. For example, the network 120 may include a cable network, a fiber optic network, or the like, or any combination thereof. The network connection between the various parts may be in one of the above-mentioned ways, and may also be in a variety of ways. In some embodiments, the network may be in point-to-point, shared, centralized, etc., various topologies, or a combination of multiple topologies. In some embodiments, the network 120 may include one or more network access points. In some embodiments, data related to the resource 150 may be communicated over the network 120.

The database 130 may be used to store data and/or instructions, and the database 130 may be directly connected to the server 110 or be internal to the server 110. In some embodiments, the database 130 may be used to store data related to the resource 150 such as the resource demands of various resource. The database 130 may be implemented in a single central server, multiple servers connected by communication links, or multiple personal devices. In some embodiments, the database 130 may be included in the server 110, the terminal device 140, and other possible system components.

The terminal device 140 refers to one or more terminal devices or software. In some embodiments, the terminal device 140 may serve as a user platform. For example, when a user of the terminal device is a rescuer, the terminal device 140 may serve as a user platform to receive the allocation scheme of rescue resource. In some embodiments, the terminal device may obtain an image of the accident point and upload it to the management platform. In some embodiments, the terminal device 140 may serve as a management platform. For example, when a user of the terminal device is a rescue resource allocation personnel, the terminal device 140 may be used as a management platform to execute a specific allocation scheme of rescue resource. In some embodiments, the user of the terminal device 140 may be one or more users. In some embodiments, the terminal device 140 may be a mobile device 140-1, a tablet computer 140-2, a laptop computer 140-3, a camera 140-4, or the like. In some embodiments, the processing device 112 may be included in the terminal device 140 and possibly other system components.

The resource 150 may be information related to available resource for a candidate resource point. For example, the resource 150 may be a resource in any form such as a medical resource 150-1, a human resource 150-2, a material resource 150-3, transportation capacity resource, fire resource, etc. In some embodiments, the resource 150 may include resource-related information such as the quantity of the resource, the storage location, the available resource, the resource demand, or the like.

It should be noted that the application scenario 100 is provided for illustrative purposes only, and is not intended to limit the scope of this present disclosure. Those ordinarily skilled in the art may make various modifications or changes based on the descriptions of the present specification. For example, the application scenario 100 may also include information sources. However, such changes and modifications do not depart from the scope of the present application.

Figure 2:
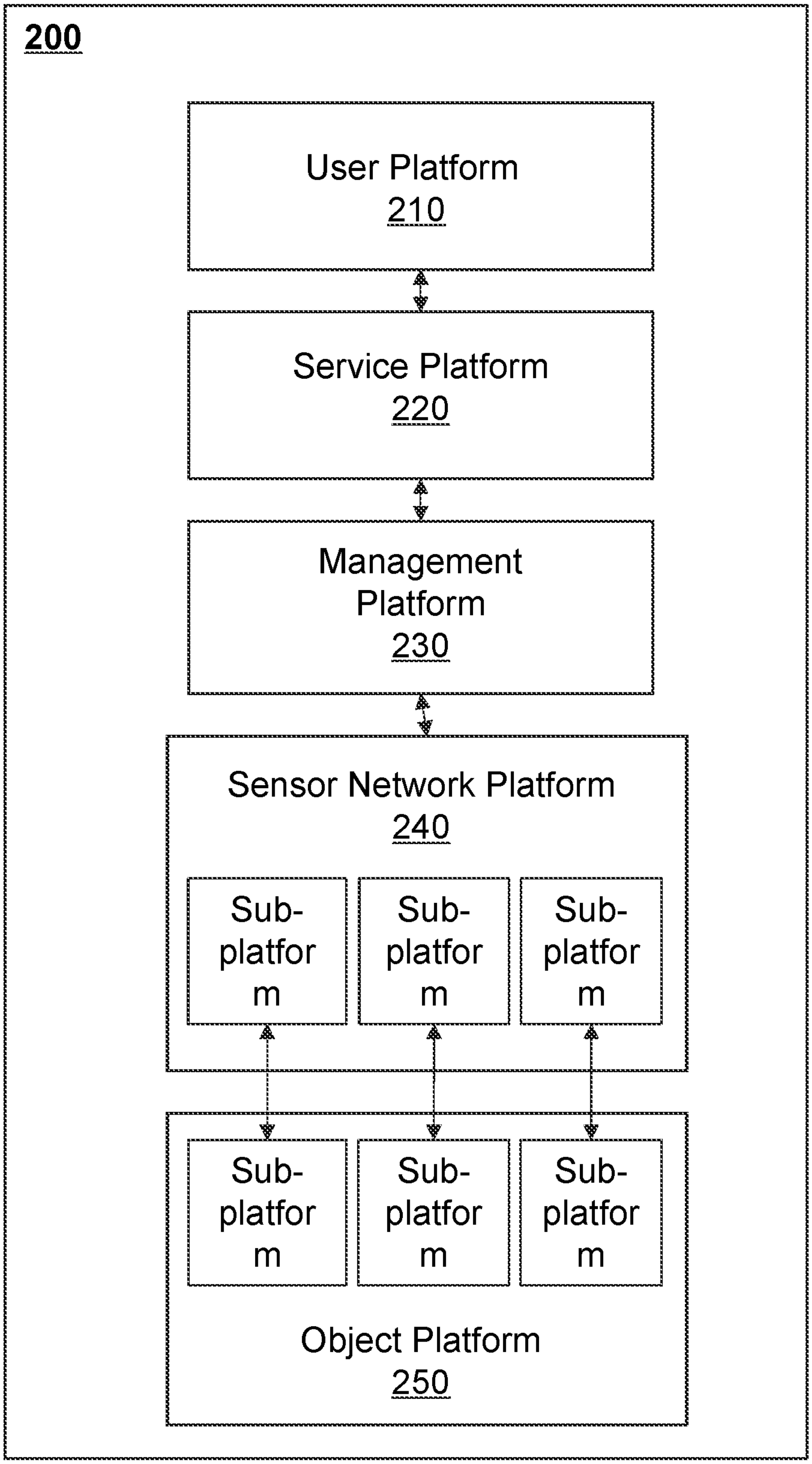
FIG. 2 is an exemplary system diagram illustrating an Internet of Things system for determining an allocation scheme of accident rescue resource in a smart city according to some embodiments of this present disclosure.

FIG. 2 is an exemplary system diagram illustrating an Internet of Things system for determining an allocation scheme of accident rescue resource in a smart city according to some embodiments of this present disclosure.

As shown in FIG. 2, the Internet of Things system 200 for determining an allocation scheme of accident rescue resource in a smart city includes a user platform 210, a service platform 220, a management platform 230, a sensor network platform 240, and an object platform 250. In some embodiments, the Internet of Things system 200 for determining an allocation scheme of accident rescue resource in a smart city may be part of or implemented by server 110.

In some embodiments, the Internet of Things system 200 for determining an allocation scheme of accident rescue resource in a smart city may be applied to various scenarios determined by the allocation scheme of accident rescue resource. In some embodiments, the Internet of Things system 200 for determining an allocation scheme of accident rescue resource in a smart city may obtain accident information of an accident point based on the object platform; send the accident information to the management platform based on the sensor network platform; determine resource demand of the accident point based on the accident information through the management platform; obtain available resource of at least one candidate rescue point based on the object platform; send the available resource to the management platform based on the sensor network platform; determine the allocation scheme of rescue resource based on the resource demand and the available resource through the management platform; and send the allocation scheme of rescue resource to the user platform through the service platform.

The various scenarios determined by the allocation scheme of accident rescue resource in the smart city may include, for example, resource allocation scenarios, resource availability prediction scenarios for resource points, and resource mapping scenarios. It should be noted that the above scenarios are only examples, and do not limit the specific application scenarios of the Internet of Things system 200 for determining an allocation scheme of accident rescue resource in a smart city. Those skilled in the art can apply the IoT system 200 for determining an allocation scheme of accident rescue resource in a smart city to any other suitable scenarios on the basis of the content disclosed in this embodiment.

In some embodiments, the Internet of Things system 200 for determining an allocation scheme of accident rescue resource in a smart city may be applied to a resource allocation scenario. When applied to the resource allocation scenario, the management platform may determine an allocation scheme of rescue resource based on the resource demand and available resource.

In some embodiments, the Internet of Things system 200 for determining an allocation scheme of accident rescue resource in a smart city may be applied to the resource availability prediction scenarios for resource points. For example, based on the idle resource of at least one candidate rescue point, the surrounding information, and the predicted rescue time, the available resource of the resource point is determined.

In some embodiments, the Internet of Things system 200 for determining an allocation scheme of accident rescue resource in a smart city may be applied to a resource mapping scenario. For example, the user platform may receive a resource map drawing request initiated by a user, the service platform transmits the drawing request to the management platform, and the management platform draws the resource map based on the rescue map.

The following will take the application of the Internet of Things system 200 for determining an allocation scheme of accident rescue resource in a smart city as an example to apply the resource allocation scenario to specifically describe the Internet of Things system 200 for determining an allocation scheme of accident rescue resource in a smart city.

The user platform 210 may be a user-oriented service interface. In some embodiments, the user platform 210 may receive the allocation scheme of rescue resource sent by the service platform.

The service platform 220 may be a platform for preliminary processing of the allocation scheme of rescue resource. In some embodiments, the service platform 220 may be used to send the allocation scheme of the rescue resource to the user platform.

The management platform 230 may refer to an Internet of Things platform that coordinates the connection and cooperation between various functional platforms and provides perception management and control management.

In some embodiments, the management platform 230 may receive accident information sent by the sensor network platform. In some embodiments, the management platform 230 may determine the resource demand of the accident point based on the accident information. In some embodiments, the management platform 230 may receive the available resource sent by the sensor network platform. In some embodiments, the management platform 230 may determine a rescue resource allocation scheme based on the resource demand and the available resource. In some embodiments, the management platform 230 may be further used to calculate the similarity between the accident information and at least one historical accident information, and obtain the similarity between the accident information and at least one historical accident information, and take the resource demand corresponding to the historical accident information with the highest similarity as the resource demand of the accident point through comparing the similarity.

The sensor network platform 240 may be a platform that realizes the interaction between the management platform and the object platform. In some embodiments, the sensor network platform 240 may send accident information to the management platform. In some embodiments, the sensor network platform 240 may send the available resource to the management platform. In some embodiments, the sensor network platform includes at least one sensor network sub-platform, each sensor network sub-platform in the at least one sensor network sub-platform corresponds to at least one object platform, and each object platform corresponds to at least one candidate rescue point. The object platform is used to obtain the available resource of the corresponding at least one candidate rescue point.

The object platform 250 may be a functional platform for the generation of perception information and the final execution of control information. In some embodiments, the object platform 250 may be used to obtain accident information at the accident point. In some embodiments, the object platform 250 may be used to obtain the available resource for at least one candidate rescue point. In some embodiments, the object platform 250 may be further used to determine at least one candidate rescue point and a surrounding demand point corresponding to each candidate rescue point in the at least one candidate rescue point; determine the predicted resource demand and accident probability of surrounding demand points; and determine the available resource of at least one candidate rescue point based on the predicted resource demand and the accident probability.

For those skilled in the art, after understanding the principle of the system, it is possible to move the Internet of Things system 200 for determining an allocation scheme of accident rescue resource in a smart city to any other suitable scenario without departing from this principle.

It should be noted that the above descriptions of the system and its parts are only for the convenience of descriptions, which does not limit the descriptions to the scope of the illustrated embodiments. It may be understood that for those skilled in the art, after understanding the principle of the system, it is possible to arbitrarily combine the various parts, or form a subsystem to connect with other parts without departing from the principle. For example, each component may share a storage device, and each component may also have its own storage device. Such deformations are within the protection range of this instructions.

Figure 3:
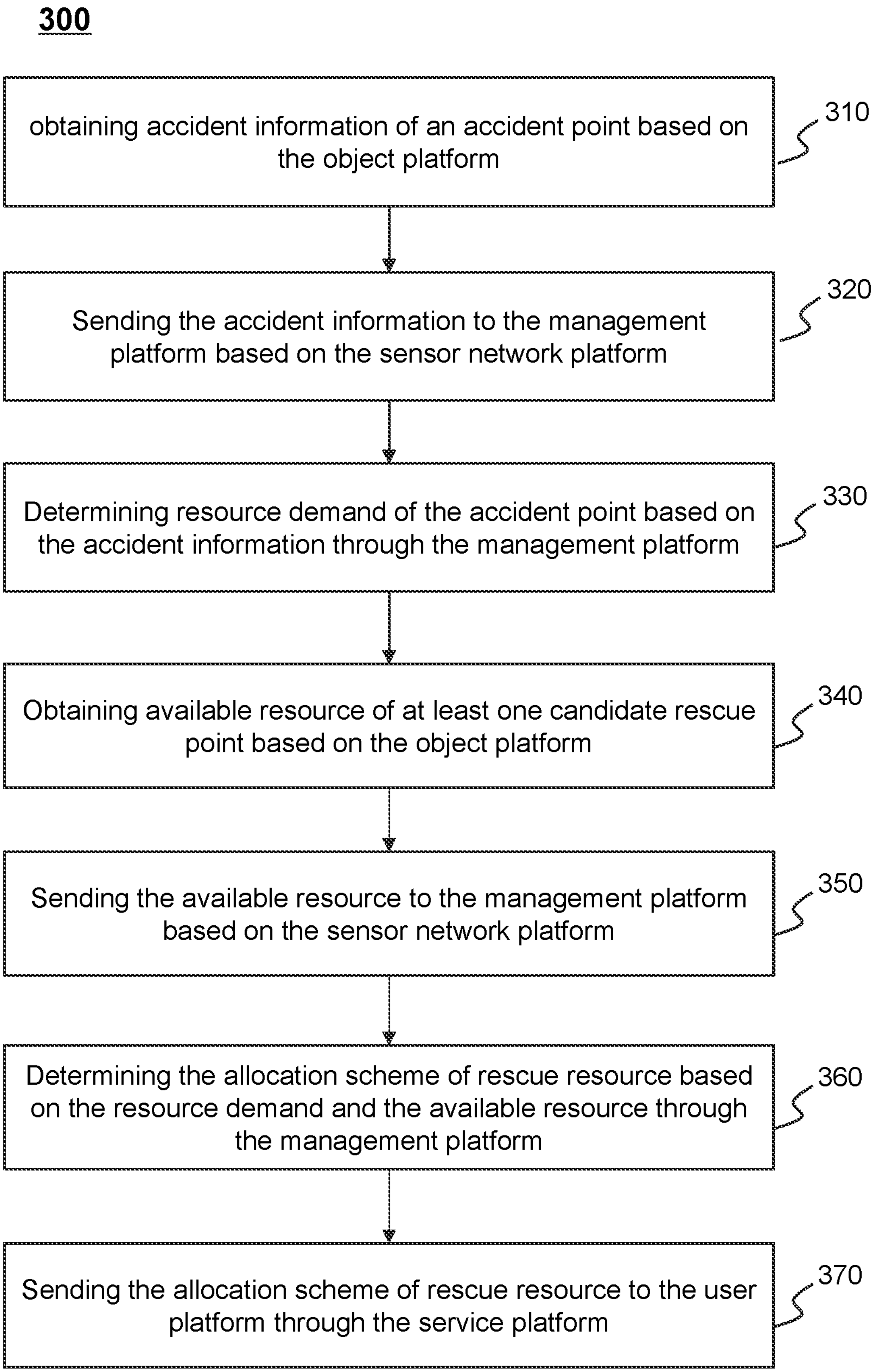
FIG. 3 is an exemplary flowchart illustrating a method for determining an allocation scheme of accident rescue resource in a smart city according to some embodiments of the present disclosure.

FIG. 3 is an exemplary flowchart illustrating a method for determining an allocation scheme of accident rescue resource in a smart city according to some embodiments of the present disclosure. In some embodiments, the process 300 may be performed by a processing device. As shown in FIG. 3, the process 300 may include the following steps.

Step 310: obtaining accident information of an accident point based on the object platform.

The accident point may be the specific point where the accident occurred. The accident point may be expressed in the form of specific coordinates, latitude and longitude, etc. For example, a car accident occurs at the accident point with coordinates (15,150), etc.

The accident information may be various types of information involved in the accident process. For example, accident image information, casualty information, property damage information, accident emergency information, and environmental information at the accident point, etc. In some embodiments, the accident information may include at least one of an accident type and an accident severity.

The accident type may be a classification of the accident that occurred. For example, man-made disasters, natural disasters, etc. For another example, car accidents, fires, epidemic, floods, earthquakes, explosions, etc. The accident severity may be the degree of damage to the accident. The accident severity may be expressed by the accident level, such as first level, second level, third level, etc. Different accident levels indicate different casualties and property losses involved in the accident.

In some embodiments, the accident information may be acquired through the user terminal based on the object platform. For example, the object platform obtains alarm information input by a user and image information of the accident point taken by a user, and uses the above information as the accident information.

Step 320, sending the accident information to the management platform based on the sensor network platform.

Step 330: determining the resource demand of the accident point based on the accident information through the management platform.

The resource demand may be the demand quantity of various resource at the accident point. For example, for material resource such as medicines, medical equipment, food, etc., the resource demand may be a specific quantity such as 50 units (the unit may be a unit for indicating the 650, such as a, set, etc.). For human resource such as firefighters, medical staff, engineering personnel, etc., the resource demand may be a specific number of people, such as 100 people. In some embodiments, the management platform may determine the resource demand of the accident point by means of fitting, calculation, simulation, etc., based on the accident information. For example, based on the accident information such as the size of the accident coverage area, the number of people affected, and the accident severity, the resource demand of the accident point is determined through simulation calculation.

In some embodiments, the processing device performs similarity calculation between the accident information and at least one historical accident information, and obtains the similarity between the accident information and at least one historical accident information; and take the resource demand corresponding to the historical accident information with the highest similarity as the resource demand of the accident point through comparing the similarity.

The similarity may be the degree of similarity between the accident information and the historical accident information. The similarity may be expressed by percentage and specific numerical value within 100, such as 90%, 83, etc. The more similar accident information such as accident type and accident severity are, the higher the similarity value is.

The historical accident information may be accident information involved in any accident before the accident information occurs. The historical accident information may correspond to historical resource demand, such as in a major car accident that occurred on Sep. 15, 2018, the demand for medical resource such as blood, ambulances, and medical staff, the demand for material resource such as food and fuel, and the demand for fire resource such as lifting equipment and firefighters. In some embodiments, the historical resource demand corresponding to the historical accident information may be stored in a database (or a storage device), and the stored historical resource demand may be called through the management platform.

In some embodiments, the processing device may process the accident information and the historical accident information into corresponding accident feature vectors, and determine the similarity between the historical accident information and the accident information based on the vector distance of the accident feature vectors.

The accident feature vector may be a vector reflecting the feature of accident information. For example, the elements of the accident feature vector may include accident type, accident severity, accident coverage area size (such as a street, a community, within 1 km of the accident point, etc.), the number of people affected, and other accident information. Each accident may correspond to at least one accident feature vector. In some embodiments, there may be a vector distance between the accident feature vectors, which may be determined by calculating the Euclidean distance between the two vectors. There is a negative correlation between vector distance and similarity. In some embodiments, the reciprocal of the absolute value of the vector distance between the accident feature vectors may be used as the similarity, or the cosine similarity between the accident feature vectors may be used as the similarity.

In some embodiments, the processing device may compare the similarity, and use the resource demand corresponding to the historical accident information with the highest similarity as the resource demand of the accident point. For example, the processing device may sort the similarity between the accident information and each historical accident information to obtain a similarity sequence. In the similarity sequence, the resource demand corresponding to the historical accident information with the highest similarity is selected as the resource demand at the accident point.

In some embodiments, the processing device may correct the resource demand of the accident point based on the estimated confidence of the accident feature vector of the accident information.

The estimated confidence level may be the confidence level of the accident feature vector. The estimated confidence level may be expressed as a percentage, such as 90%, 70%, etc. The estimated confidence may be determined by manual settings. In some embodiments, the estimated confidence may be related to accident information. For example, when the environmental information of the accident point in the accident information includes obstructions such as thick smoke and rubble, which makes it difficult to obtain other accident information at the accident point, the accident information may correspond to a lower estimated confidence level, such as 60%. When an accident survivor calls the police and the accident information is easy to obtain, the accident information may correspond to a higher estimated confidence, such as 95%.

In some embodiments, the estimated confidence may be determined from accident image information. For example, when the accident image may fully reflect the accident information, it corresponds to a higher estimated confidence such as 95%; when the accident image may only reflect one-sided accident information, or it cannot be judged as an accident, it corresponds to a lower estimated confidence such as 30%.

In some embodiments, the processing device may correct the resource demand of the accident point based on the estimated confidence. For example, when the estimated confidence is lower than the threshold value, such as less than 60%, the resource demand for the accident point should be appropriately increased, such as the demand for medical supplies and fire fighting materials should be increased by 10% to avoid misjudgment of resource demand; when the estimated confidence is higher than the threshold, such as higher than 95%, the resource demand for the accident point may be performed based on the resource demand corresponding to the historical accident information with the highest similarity.

Step 340: obtaining available resource of at least one candidate rescue point based on the object platform.

The candidate rescue point refers to the rescue point that can provide resource for the accident point. For example, the candidate rescue point may be a hospital, a fire station, a warehouse, an emergency center, or the like. The candidate rescue point may provide various forms of available resource including medical resource, human resource, material resource, etc.

The available resource may be the maximum amount of resource that the candidate rescue point may provide. For example, for a hospital, the available resource may be the number of medical staffs, blood, ambulance, tranquilizer, etc.; for warehouses, the available resource may be the amount of food, drinking water, tents, and other materials. In some embodiments, the available resource may be determined based on the amount of idle resource of at least one candidate rescue point. For example, it may be determined based on the existing inventory in the warehouse, or based on the actual number of medical staff available in the hospital.

In some embodiments, the available resource may be the difference between the idle resource and the predicted demand for resource of surrounding demand points. For example, the available resource of a candidate rescue point may be that, on the premise of meeting the predicted resource demand of the surrounding demand points, the remaining resource in the idle resource other than the predicted resource demand are regarded as the available resource.

In some embodiments, the available resource of at least one candidate rescue point is obtained based on the object platform. For example, the available resource may be determined through the object platform based on the predicted demand for resource of the surrounding demand points corresponding to at least one candidate rescue point. For the specific description of determining the available resource by the predicted resource demand of the surrounding demand points, please refer to FIG. 4 and its related descriptions. In some embodiments, the available resource may be determined based on the object platform by means of data fitting, simulation calculation, or the like. In some embodiments, the available resource may be determined through a prediction model, please refer to FIG. 6 and its related descriptions.

Step 350, sending the available resource to the management platform based on the sensor network platform.

Step 360: determining an allocation scheme of rescue resource based on the resource demand and available resource through the management platform.

The allocation scheme of rescue resource may be a resource rescue scheme for the accident point with the available resource for each candidate rescue point. The allocation scheme of rescue resource may include information such as the selected candidate rescue points, the amount of resource that each of the selected candidate rescue points needs to provide, and the paths of resource provided by each of the selected candidate rescue points. The allocation scheme of rescue resource may be expressed in any form of data such as text, tables, and drawings.

In some embodiments, the management platform determines an allocation scheme of rescue resource based on the resource demand and available resource. For example, the management platform determines the candidate rescue points that provide resource based on the available resource of all candidate rescue points and the resource demand of the accident point. Further, the management platform determines the quantity and type of resource provided by each candidate rescue point for the accident point, as well as the transportation time and transportation mode of the resource and uses the above information as a rescue resource allocation scheme.

Step 370: sending the allocation scheme of rescue resource to the user platform through the service platform.

In some embodiments, the service platform may send the allocation scheme of rescue resource to the user platform through the network. After receiving it, the user platform displays the allocation scheme of rescue resource to a user in various forms such as text, voice, image, etc.

Through the method for determining an allocation scheme of accident rescue resource in a smart city described in some embodiments of this present disclosure, when an accident occurs, resource may be reasonably allocated to multiple candidate resource points, so as to realize the intelligent determination of the resource allocation scheme, avoid waste of time and labor costs in determining manual schemes, and further avoid unreasonable resource allocation delaying accident rescue.

It should be noted that the descriptions of the relevant process 300 is merely for example and description, without limiting the scope of the present disclosure. The process 300 may be made various modifications and changes by those skilled in the art under the guidance of the present disclosure. However, these modifications and changes are still within the scope of the present disclosure. For example, the process 300 may also include post-processing steps.

Figure 4:
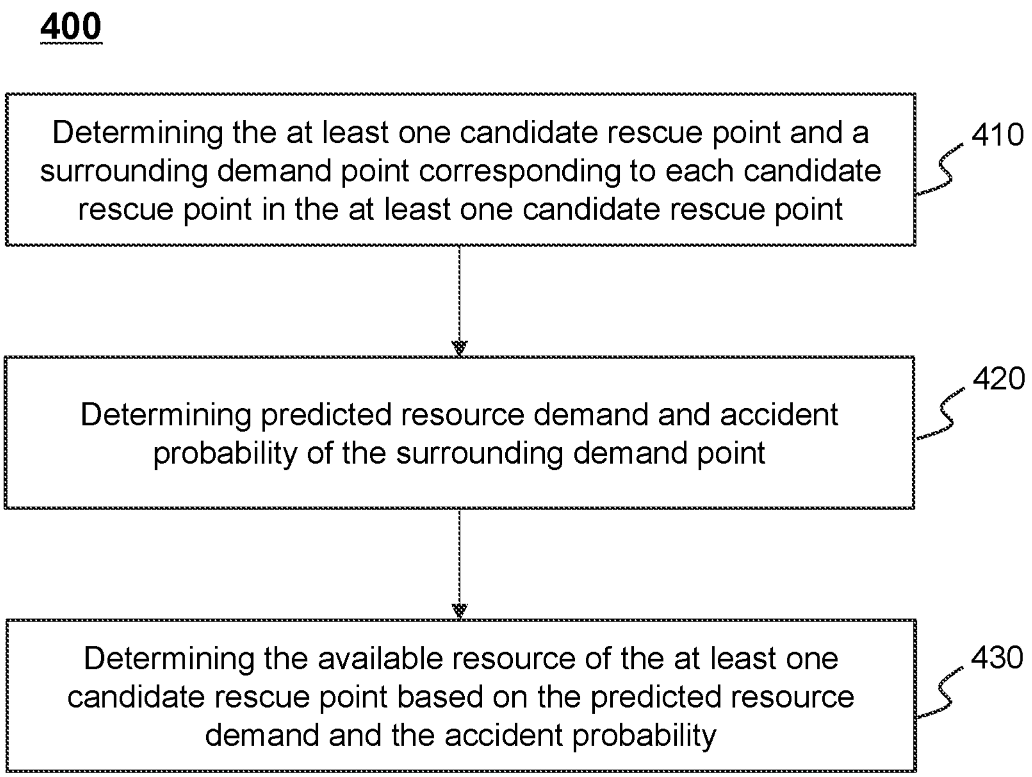
FIG. 4 is an exemplary flowchart illustrating a process for determining available resource of at least one candidate rescue point according to some embodiments of the present disclosure.

FIG. 4 is an exemplary flowchart illustrating a process for determining available resource of at least one candidate rescue point according to some embodiments of the present disclosure. In some embodiments, the process 400 may be performed by a processing device. As shown in FIG. 4, the process 400 may include the following steps.

Step 410: determining at least one candidate rescue point and a surrounding demand point corresponding to each candidate rescue point in the at least one candidate rescue point.

The surrounding demand point may be a location point near the candidate rescue point where an accident may require resource. For example, the surrounding demand point may be traffic accident-prone points, residential areas, schools, chemical plants, mines, etc. within 3 kilometers of the candidate rescue point. In some embodiments, the surrounding demand point may also be a demand point whose level is greater than the second level, and the number of hops with the resource node or the transportation duration is less than a threshold value. For related content of the thresholds of level, number of hops, and transportation duration, please refer to FIG. 5 and its related descriptions. In some embodiments, the candidate rescue point and the corresponding surrounding demand point may be determined by invoking a map near the candidate rescue point through the network, or determined by manual annotation.

Step 420: determining the predicted resource demand and accident probability of the surrounding demand points.

The predicted resource demand may be the resource demand when an accident occurs at a surrounding demand point. In some embodiments, the predicted resource demand may be determined by a preset relationship between the accident information and the resource demand. For example, when an accident occurs at a surrounding demand point, the number of people affected is 50, the preset amount of food resource allocated by each person is 5 units (the unit may be any unit that represents the amount of resource, such as parts, pieces, etc.), the preset allocation of medical resource for each person is 2 units, and the predicted resource demand in the event of an accident at the surrounding demand point is 50×5=250 units of food resource and 50×2=100 units of medical resource. In some embodiments, the preset relationship between the accident information and the resource demand may be determined by the historical resource demand corresponding to the historical accident information.

The accident probability may be the probability of an accident occurring at the surrounding demand point. The accident probability may be expressed as a percentage, such as 0.003%, 0.005%, etc. In some embodiments, the accident probability of a certain surrounding demand point may be determined based on the statistics of historical transmission accidents of the surrounding demand point. For example, in the statistical process, the ratio of the number of days of historical accidents to the total number of days in the statistics is taken as the accident probability, or the frequency of accidents during the statistical period is taken as the accident probability.

Step 430: determining the available resource of at least one candidate rescue point based on the predicted resource demand and the accident probability.

In some embodiments, the available resource of the candidate rescue point may be determined based on the predicted resource demand and the accident probability. For example, for a certain candidate rescue point, the available resource of the candidate rescue point is taken as its idle resource minus the sum of the product of the predicted resource demand of each surrounding demand point and the accident probability of each surrounding demand point. The specific calculation is shown in formula (1):

$$K=L-(P_1M_1+P_2M_2\ldots+P_NM_N) \quad (1)$$

where K is the available resource, L is the idle resource, $P_1$, $P_2 \ldots P_N$ are the accident probabilities of N surrounding demand points, respectively, $M_1$, $M_2 \ldots M_N$ are the predicted resource demand of the surrounding demand points, respectively.

Through the process of determining the available resource described in some embodiments of this present disclosure, the available resource for candidate rescue points may be clarified, which provides a basis for determining the subsequent allocation scheme of rescue resource. In addition, the above data is based on the historical accident information, and the predicted resource demand is predicted in multiple aspects, so that the obtained data may better meet the resource demand of the surrounding demand points, and the data has practical reference significance.

It should be noted that the descriptions of the above-mentioned process 400 is only for examples and descriptions, but not limit the scope of the application of the present disclosure. For those skilled in the art, various modifications and changes may be made to the process 400 under the guidance of the present disclosure. However, these modifications and changes are still within the scope of the present disclosure. For example, the process 400 may also include post-processing steps.

Figure 5:
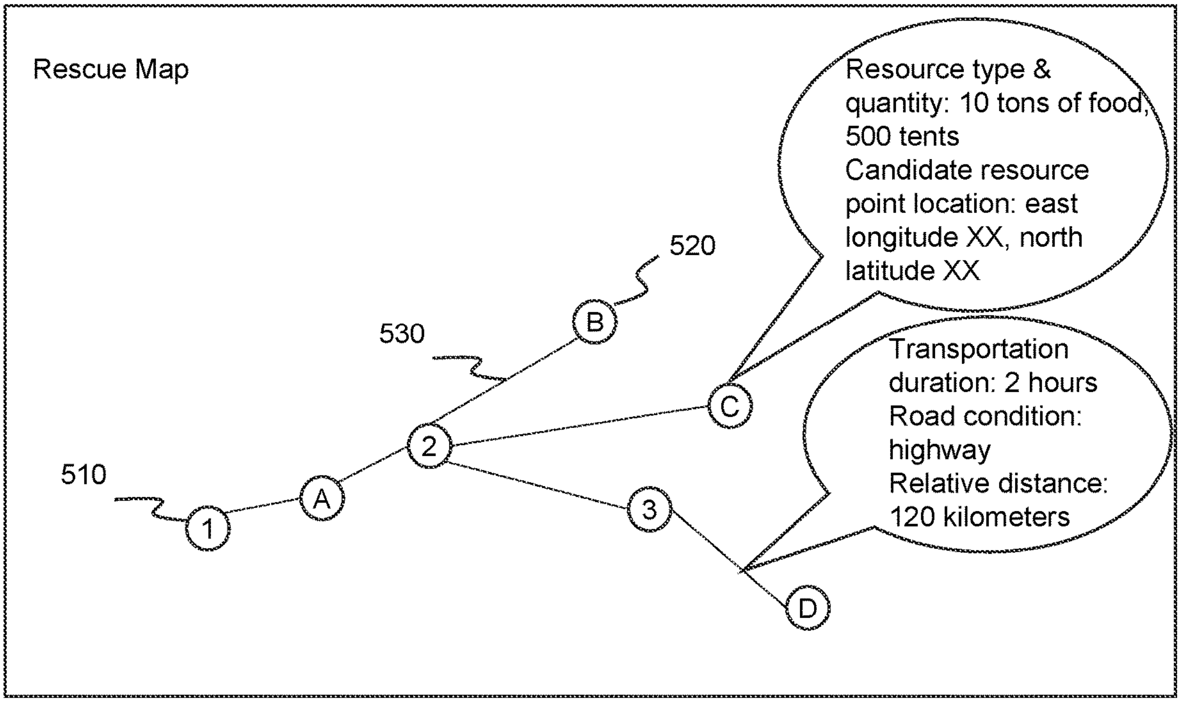
FIG. 5 is an exemplary schematic diagram illustrating a rescue map according to some embodiments of the present disclosure.

FIG. 5 is an exemplary schematic diagram illustrating a rescue map according to some embodiments of the present disclosure.

In some embodiments, the at least one candidate rescue point and the surrounding demand point corresponding to each candidate rescue point in the at least one candidate rescue point are determined based on a rescue map. The rescue map 500 may be a data map reflecting the relationship between accident point in a certain area, candidate rescue points, and their own characteristics.

In some embodiments, the rescue map may include at least two nodes and at least one edge. The nodes may be accident point or location point or area of a candidate rescue point. The nodes may include a regional node as well as a resource node. In some embodiments, the position of the node may be the position of the accident point or the candidate rescue point in the map, that is, the position of the node may be the actual position of the above point in the map or the relative position between the nodes.

The regional node 510 may be a location point or area where an accident may occur. For example, the regional node may be node 1, node 2, and node 3 in FIG. 5. The regional node may correspond to accident point or surrounding demand point. The node may include node characteristics, which may correspond to the accident information. For example, the node characteristics may include characteristics such as resource type, resource quantity, location coordinates, or the like. In some embodiments, the regional node may include information such as required resource type, resource quantity, location coordinates of the regional nodes, or the like. For example, node 2 in FIG. 5 is an accident point, which further includes the type and quantity of resource required: 2 tons of food, 100 tents, 0.5 tons of medicine, and 50 firefighters.

The resource node 520 may be a location point or area where resource may be provided. For example, the resource node may be node A, node B, node C, and node D in FIG. 5. The resource node may correspond to candidate rescue points. For example, node A in FIG. 5 is a candidate resource point, which further includes the type and quantity of resource that may be provided: 10 tons of food, 500 tents; node B is a candidate resource point, which further includes the type and quantity of resource that may be provided: 5 tons of medicines, 100 medical staff; node C is a candidate resource point, which further includes the type and quantity of resource that may be provided: 10 tons of food, 500 tents; node D is a candidate resource point, which further includes the type and quantity of resource that may be provided: 150 firefighters and several firefighting equipment.

The edge 530 may reflect the relative relationship between the two nodes being connected. The edge may connect regional nodes and resource nodes with transportation paths. The edge may include edge characteristics. For example, edge characteristics may be characteristics such as straight-line distance between nodes, road conditions, speed of transportation resource, difficulty of transportation resource, transportation duration, etc. Edge A2 in FIG. 5 further includes transportation duration: 0.5 hours, road condition: highway, relative distance: 30 km; edge B2 in FIG. 5 further includes transportation duration: 2 hours, road condition: dirt road, relative distance: 100 km; edge C2 in FIG. 5 further includes transportation duration: 3 hours, road condition: highway, relative distance: 170 km; edge 23 in FIG. 5 further includes transportation duration: 1.5 hours, road condition: road, relative distance: 90 km; and edge D3 in FIG. 5 further includes transportation duration: 2 hours, road condition: highway, relative distance: 120 km.

As shown in FIG. 5, for node 2, the food and tents it needs may be obtained through nodes A and C, but the transportation duration of edge A2 is longer than that of edge C2, so node A is selected to provide food and tents. The medicines required by node 2 may be obtained through node B, and the firefighters may be obtained through node D. It should be understood that the predicted time required for the materials to arrive at the accident point may be further calculated through FIG. 5. For example, the arrival of firefighters needs to pass through edges D3 and 23, and the time required for the arrival of firefighters is the sum of the transportation duration included in the two edges, that is, 1.5+2=3.5 hours. It can be understood that the remaining materials after the rescue of the candidate material points may also be calculated by using FIG. 5. For example, for node B, the remaining medicine after rescue is 5−0.5=4.5 tons.

For node A, the pre-stored food and tent may be determined by nodes 1 and 2. For example, the accident probability of nodes 1 and 2 may be obtained from the historical accident frequencies of nodes 1 and 2; the expected summation of the resource demands of nodes 1 and 2 is obtained by the following formula (2):

$$S=P_1M_1+P_2M_2 \tag{2}$$

where S is the minimum resource demand of node A, $P_1$ is the accident probability of node 1, $P_2$ is the accident probability of node 2, $M_1$ is the resource demand of node 1, and $M_2$ is the resource demand of node 2. By calculating the total resource demand of node A, the minimum resource amount that node A needs to pre-store is determined in order to ensure the accident demand that may occur at nodes 1 and 2.

In some embodiments, the accident rescue process may have a time attribute. For example, a fire accident at node 1 is expected to require 6 hours of accident rescue time. The time attribute of the accident rescue process may be determined based on the average rescue process time of historical accidents (such as the historical accident with the highest accident information similarity, and the historical accident with the closest accident feature vector distance).

In some embodiments, the pre-stored resource may have a time attribute. For example, the number of firefighters available from 1:00 to 23:00 is 15; the number of medical masks that may be used from May 1 to May 5 is 500. The time attribute of the pre-stored resource needs to match the time attribute of the accident rescue process. For example, the time period of the pre-stored resource may include a time point when the accident may occur, and a time period of the accident rescue process. Similarly, the transportation time of the pre-stored resource also needs to match the time attribute of the accident rescue process.

In some embodiments, when the resource type is a person or material that may participate in work/reuse multiple times, such as medical personnel, firefighters, firefighting equipment, etc., it is necessary to take the total resource demand of nodes 1 and 2 when an accident occurs at the same time as the resource demand of node A.

In some embodiments, the transportation duration or the relative positional relationship in the rescue map between the at least one candidate rescue point and the accident point meets a first preset condition.

The first preset condition may be that the transportation duration between the at least one candidate rescue point and the accident point is less than a threshold, the relative position distance in the rescue map is less than a threshold, or the like. For example, the transportation duration between the candidate rescue point and the accident point is less than 2 hours, and the relative position distance between the candidate rescue point and the accident point is less than 100 kilometers. When the transportation duration between at least one candidate rescue point and the accident point or the relative positional relationship in the rescue map meets the first preset condition, it may be determined that the candidate rescue point may rescue the accident point in time.

In some embodiments, the transportation duration or the relative positional relationship in the rescue map between the at least one candidate rescue point and the corresponding surrounding demand point meets a second preset condition.

The second preset condition may be that the transportation duration between the at least one candidate rescue point and the corresponding surrounding demand point is less than a threshold, the relative position distance in the rescue map is less than a threshold, or the like. For example, the transportation duration between the candidate rescue point and the corresponding surrounding demand point is less than 4 hours, the relative position distance between the candidate rescue point and the corresponding surrounding demand point is less than 200 kilometers, etc. In some embodiments, the second preset condition may also be that the number of hops between the at least one candidate rescue point and the surrounding demand points is less than a threshold. The number of hops of the surrounding demand points may be the number of edges involved in the shortest path between the surrounding demand points and at least one candidate rescue point. For example, the number of hops between node A and node 3 is 2.

When the available resource corresponding to all the candidate rescue points that meet the first preset condition and the second preset condition are not enough to meet the resource demand (which may be the needs of resource types and resource quantities) of the accident point or the surrounding demand points, the processing device may amend the first preset condition and the second preset condition to expand the demand range. For example, if a candidate rescue point with a transportation duration, which is less than 2 hours for transporting resource to the accident point, lacks the medicines required by the accident point, the first preset condition is expanded from a transportation duration of less than 2 hours to a transportation duration of less than 4 hours.

In some embodiments, at least one candidate rescue point is a resource node including at least one level in the rescue map. The level is related to the transportation duration between the at least one candidate rescue point and the accident point. The high-level candidate rescue point is given priority to provide rescue resource for the accident point.

The level may be a parameter related to the transportation duration between the at least one candidate rescue point and the accident point. For example, the level may include first, second, third, and so on. The high level means that the transportation duration between the candidate rescue point and the accident point is small, and the candidate rescue point has a high priority. The low level means that the transportation duration between the candidate rescue point and the accident point is longer, and the candidate rescue point has a low priority. For example, for node A and node C, both may provide food, tents for node 2, but node A has a higher level due to the shorter transportation duration to node 2, therefore, node 2 is preferentially transported through node A.

It should be noted that the level "first level" may be the highest level or the lowest level. The descriptions of high-level and low-level in this present disclosure is intended to illustrate, and not mean to limit the priority order of level numbers (such as first-level, second-level, third-level . . . ).

Through the rescue map described in some embodiments of this preset disclosure, the visual processing of the material dispatching process may be realized, and the process monitoring in the material dispatching process may be facilitated. In addition, setting the level of the candidate resource points may realize a more reasonable allocation of resource, and minimize the transportation time on the premise of completing the resource allocation.

Figure 6:
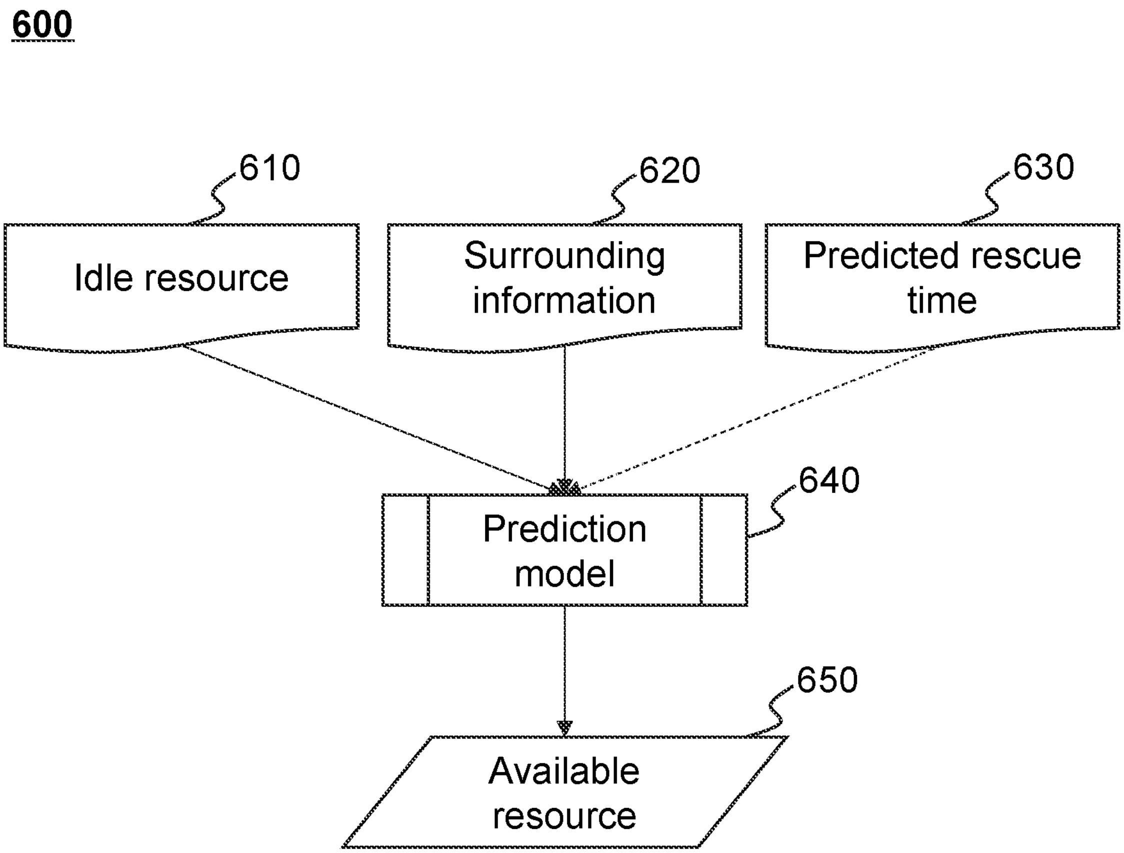
FIG. 6 is an exemplary schematic diagram illustrating a model structure of a prediction model according to some embodiments of the present disclosure.

FIG. 6 is an exemplary schematic diagram illustrating a model structure of a prediction model according to some embodiments of the present specification. The model structure 600 of the prediction model is shown in FIG. 6.

The prediction model may be a model for predicting the available resource for at least one candidate rescue point. The prediction model may be a machine learning model. For example, deep neural network models, etc.

The input of the prediction model 640 at least includes the idle resource 610 of the at least one candidate rescue point and the surrounding information 620, and the output of the prediction model 640 may include the available resource 650 of the at least one candidate rescue point.

The surrounding information may be information related to surrounding demand points corresponding to at least one candidate rescue point. The surrounding information may include node characteristics of the regional nodes corresponding to the surrounding demand points. For example, the surrounding information may include information about possible accidents corresponding to surrounding demand points, the number of people affected by the accident, the type of resource demand corresponding to the accident, the quantity of resource demand, and other information. The surrounding information may be determined by the accident information corresponding to the historical accidents that occurred at the surrounding demand points.

In some embodiments, the input of the prediction model may also include predicted rescue time 630. The predicted rescue time may be the time period from the start of the rescue to the end of the rescue. The predicted rescue time may be determined by the rescue time of the historical accident rescue.

In some embodiments, the prediction model may be trained from multiple labeled training samples. For example, the multiple labeled training samples may be input into the initial prediction model, a loss function may be constructed from the labels and the results of the initial prediction model, and the parameters of the initial prediction model may be iteratively updated by gradient descent or other methods based on the loss function. When the preset conditions are met, the model training is completed, and the trained prediction model is obtained. The preset conditions may be that the loss function converges, the number of iterations reaches a threshold, or the like.

In some embodiments, the training samples may at least include historical idle resource, historical surrounding information, and historical rescue time. The labels may be the available resource corresponding to the above historical data. The labels may be obtained manually.

In some embodiments, the processing device may input the idle resource, surrounding information, and rescue time of each candidate rescue point corresponding to the accident point into the prediction model to obtain the available resource corresponding to each candidate rescue point. In some embodiments, for candidate rescue points whose available resource output by the prediction model are less than a first threshold, supplies are provided by candidate rescue points whose available resource are greater than a second threshold.

The first threshold may be a reference value reflecting whether the available resource of the candidate rescue point can maintain rescue. When the available resource is less than the first threshold, it means that the candidate rescue point has insufficient inventory, and the rescue may hardly be maintained.

The second threshold may be a reference value reflecting whether the available resource of the candidate rescue point far exceed the available resource required to maintain the rescue. When the available resource is greater than the second threshold, it means that the candidate rescue point has sufficient inventory, and on the premise that the rescue may be maintained, the inventory may also be replenished for other rescue points.

Through the prediction model described in some embodiments of this present disclosure, intelligent prediction of available resource of candidate rescue points may be realized, avoiding errors and low efficiency caused by manual estimation. In addition, resource complementarity is realized between candidate rescue points, which improves the rationality of resource allocation and enables candidate rescue points to cover more regional nodes.

It should be noted that the above descriptions of the system and its parts are only for the convenience of description, and not limit the description to the scope of the illustrated embodiments. It may be understood that for those skilled in the art, after understanding the principle of the system, it is possible to arbitrarily combine the various parts, or form a subsystem to connect with other parts without departing from the principle. For example, each component may share a storage device, and each component may also have its own storage device. Those variations and modifications may be within the scope of the protection of one or more embodiments of the disclosure.

Some embodiments of the present disclosure also disclose a computer-readable storage medium, the storage medium stores computer instructions, and when the computer instructions are executed by a processor, the method for determining an allocation scheme of accident rescue resource in a smart city is implemented.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for determining an allocation scheme of accident rescue resources in a smart city, wherein the method is implemented by at least one processing device of an Internet of Things system determined by the allocation scheme of accident rescue resources in the smart city, and the Internet of Things system comprises a user platform, a service platform, a management platform, a sensor network platform, and an object platform;

the method comprises:

obtaining accident information of an accident point through a terminal device based on the object platform;

sending the accident information to the management platform based on the sensor network platform;

determining resource demand of the accident point based on the accident information through the management platform, and storing the resource demand in a database;

obtaining an available resource of at least one candidate rescue point based on the object platform, comprising:

determining the available resource of the at least one candidate rescue point based on a prediction model, wherein inputs of the prediction model at least include an idle resource and surrounding information of the at least one candidate rescue point, the prediction model is a machine learning model, the surrounding information is information related to a surrounding demand point corresponding to the at least one candidate rescue point, wherein the at least one candidate rescue point and the surrounding demand point corresponding to each candidate rescue point in the at least one candidate rescue point are determined based on a rescue map, wherein the rescue map includes at least two nodes and at least one edge, the at least two nodes include a regional node and a resource node, the regional node includes the accident point and the surrounding demand point, and the at least one edge is used to connect the regional node and the resource node where a transport path exists;

the at least one candidate rescue point is a resource node including at least one level in the rescue map, the level is related to a transportation duration between the at least one candidate rescue point and the accident point, and the candidate rescue point with a high level is given priority to provide at least one rescue resource for the accident point; and the prediction model is obtained by training an initial prediction model based on multiple training samples with labels, the training comprising:

inputting the multiple training samples with the labels into the initial prediction model, constructing a loss function from the labels and output results of the initial prediction model, updating parameters of the initial prediction model iteratively based on the loss function; and completing model training and obtaining the prediction model when preset conditions are met;

sending the available resource to the management platform based on the sensor network platform;

determining the allocation scheme of rescue resources based on the resource demand and the available resource through the management platform; and sending the allocation scheme of rescue resources to the terminal device of the user platform through the service platform.

2. The method of claim 1, wherein the available resource is determined based on the idle resource of the at least one candidate rescue point and predicted resource demand of the surrounding demand point corresponding to the at least one candidate rescue point.

3. The method of claim 1, wherein the sensor network platform includes at least one sensor network sub-platform, each sensor network sub-platform in the at least one sensor network sub-platform corresponds to at least one of object platforms, and each of the object platforms corresponds to the at least one candidate rescue point; and the object platform is used to obtain the available resource of the corresponding at least one candidate rescue point.

4. The method of claim 3, wherein the determining resource demand of the accident point based on the accident information through the management platform comprises:

obtaining a similarity between the accident information and at least one historical accident information through performing similarity calculation on the accident information and the at least one historical accident information; and taking resource demand corresponding to the historical accident information with the highest similarity as the resource demand of the accident point through comparing the similarity.

5. The method of claim 1, wherein the obtaining an available resource of at least one candidate rescue point based on the object platform comprises:

determining the at least one candidate rescue point and the surrounding demand point corresponding to each candidate rescue point in the at least one candidate rescue point;

determining predicted resource demand and accident probability of the surrounding demand point; and determining the available resource of the at least one candidate rescue point based on the predicted resource demand and the accident probability.

6. The method of claim 1, wherein the transportation duration between the at least one candidate rescue point and the accident point or a relative positional relationship in the rescue map meets a first preset condition, and a transportation duration between the at least one candidate rescue point and the corresponding surrounding demand point or the relative positional relationship in the rescue map meets a second preset condition.

7. The method of claim 1, wherein the accident information includes at least one of accident type and accident severity.

8. The method of claim 4, wherein the performing similarity calculation on the accident information and the at least one historical accident information comprises:

processing the accident information and the at least one historical accident information into at least one accident feature vector, and determining the similarity between the at least one historical accident information and the accident information based on a vector distance of the at least one accident feature vector.

9. The method of claim 8, wherein determining the resource demand comprises:

correcting the resource demand of the accident point an estimated confidence of the at least one accident feature vector of the accident information.

10. The method of claim 1, wherein the surrounding demand point includes a demand point whose number of hops with the resource node or the transportation duration with the resource node is less than a threshold; wherein the surrounding information includes node characteristic of the regional node corresponding to the surrounding demand point.

11. A system of an Internet of Things for determining an allocation scheme of accident rescue resources in a smart city, the Internet of Things system comprising a user platform, a service platform, a management platform, a sensor network platform, and an object platform, wherein the Internet of Things system further comprises: a non-transitory computer-readable storage medium storing computer instructions; and at least one processor in communication with the non-transitory computer-readable storage medium, when executing the computer instructions, the at least one processor is directed to cause the Internet of Things system to perform operations including:

obtaining accident information of an accident point through a terminal device based on the object platform;

sending the accident information to the management platform based on the sensor network platform;

determining resource demand of the accident point based on the accident information through the management platform, and storing the resource demand in a database;

obtaining an available resource of at least one candidate rescue point based on the object platform; wherein to the available resource of the at least one candidate rescue point based on the object platform, the at least one processor is further directed to cause the Internet of Things system to perform operations including:

determining the available resource of the at least one candidate rescue point based on a prediction model, wherein inputs of the prediction model at least include an idle resource and surrounding information of the at least one candidate rescue point, the prediction model is a machine learning model, the surrounding information is information related to a surrounding demand point corresponding to the at least one candidate rescue point, wherein the at least one candidate rescue point and the surrounding demand point corresponding to each candidate rescue point in the at least one candidate rescue point are determined based on a rescue map, wherein the rescue map includes at least two nodes and at least one edge, the at least two nodes include a regional node and a resource node, the regional node includes the accident point and the surrounding demand point, and the at least one edge is used to connect the regional node and the resource node where a transport path exists;

the at least one candidate rescue point is a resource node including at least one level in the rescue map, the level is related to a transportation duration between the at least one candidate rescue point and the accident point, and the candidate rescue point with a high level is given priority to provide at least one rescue resource for the accident point; and the prediction model is obtained by training an initial prediction model based on multiple training samples with labels, the training comprising:

inputting the multiple training samples and the labels into the initial prediction model, constructing a loss function from the labels and output results of the initial prediction model, updating parameters of the initial prediction model iteratively based on the loss function; completing model training and obtaining the prediction model when preset conditions are met;

sending the available resource to the management platform based on the sensor network platform;

determining the allocation scheme of rescue resources based on the resource demand and the available resource through the management platform; and sending the allocation scheme of rescue resources to the terminal device of the user platform through the service platform.

12. The system of claim 11, wherein the available resource is further determined based on the idle resource of the at least one candidate rescue point and predicted resource demand of the surrounding demand point corresponding to the at least one candidate rescue point.

13. The system of claim 11, wherein the sensor network platform includes at least one sensor network sub-platform, each sensor network sub-platform in the at least one sensor network sub-platform corresponds to at least one of object platforms, and each of the object platforms corresponds to the at least one candidate rescue point; and the object platform is used to obtain the available resource of the corresponding at least one candidate rescue point.

14. The method of claim 13, wherein the at least one processor is further directed to cause the Internet of Things system to perform operations including:

obtaining a similarity between the accident information and at least one historical accident information through performing similarity calculation on the accident information and the at least one historical accident information; and taking resource demand corresponding to the historical accident information with the highest similarity as the resource demand of the accident point through comparing the similarity.

15. The system of claim 11, wherein the at least one processor is further directed to cause the Internet of Things system to perform operations including:

determining the at least one candidate rescue point and the surrounding demand point corresponding to each candidate rescue point in the at least one candidate rescue point;

determining predicted resource demand and accident probability of the surrounding demand point; and determining the available resource of the at least one candidate rescue point based on the predicted resource demand and the accident probability.

16. The system of claim 11, wherein the transportation duration between the at least one candidate rescue point and the accident point or a relative positional relationship in the rescue map meets a first preset condition, and a transportation duration between the at least one candidate rescue point and the corresponding surrounding demand point or the relative positional relationship in the rescue map meets a second preset condition.

17. A non-transitory computer-readable storage medium, wherein the storage medium stores computer instructions, and the computer instructions are executed by a processor to implement the method of claim 1.

* * * * *